April 7, 1964

L. KAUFMAN ETAL 3,128,464

NAVIGATION INSTRUMENT FOR DIRIGIBLE CRAFT

Filed Dec. 16, 1959

INVENTORS
LLOYD KAUFMAN
RICHARD R. STROCK
BY
ATTORNEY

United States Patent Office 3,128,464
Patented Apr. 7, 1964

3,128,464
NAVIGATION INSTRUMENT FOR DIRIGIBLE CRAFT
Lloyd Kaufman, Freeport, and Richard R. Strock, Levittown, N.Y., assignors to Sperry Rand Corporation, Great Neck, N.Y., a corporation of Delaware
Filed Dec. 16, 1959, Ser. No. 859,976
15 Claims. (Cl. 343—107)

This invention relates to navigation instruments for dirigible craft and particularly to navigation instruments of the type which display to the pilot a pictorial illustration of the position and direction of movement of the craft relative to the ground, commonly called the ground track and with respect to a desired course. The instrument of the present invention may be utilized as a pilot aid for the manual control of the craft by the pilot or as an instrument for enabling the pilot to monitor the control of the craft by an automatic pilot.

It is a primary object of the present invention to provide a navigation instrument for dirigible craft which pictorially provides a realistic presentation of the azimuthal condition of said craft.

It is a further object of the present invention to provide a navigation instrument for dirigible craft which realistically presents the ground track and the desired course with respect to the craft.

It is an additional object of the present invention to provide a navigation instrument for dirigible craft which realistically presents, as cooperable indices, the heading of the craft and its position relative to its ground track and the desired course.

The above objects are achieved by providing a navigation instrument with a fixed reference index that simulates the craft and is cooperative with a compass card for indicating the heading of the craft. A ground track pointer actuated in accordance with the ground track of the craft is cooperative with the reference index and the compass card. A selected course index is arranged to be cooperative with the reference index and the compass card while a course deviation pointer is cooperative with all the above mentioned elements. The combination of elements doescribed above is actuated to provide instantaneous ground track information with respect to the desired course and the reference index which is not available in prior art navigation display instruments. Anticipatory information develops from this presentation because as the ground track varies, the ground track pointer is displaced to show departure from the selected course which anticipates the deviation indicated by the course deviation pointer.

These and other objects will become apparent as the description of a preferred embodiment of the present invention proceeds with reference to the accompanying drawings wherein:

FIG. 3 is a perspective view showing the relative positions of the movable indices and the mounting of the azimuth stabilized meter movement.

A preferred embodiment of the present invention will be described with reference to an airplane although it will be appreciated that the invention is equally adaptable to marine craft.

Figure 1:
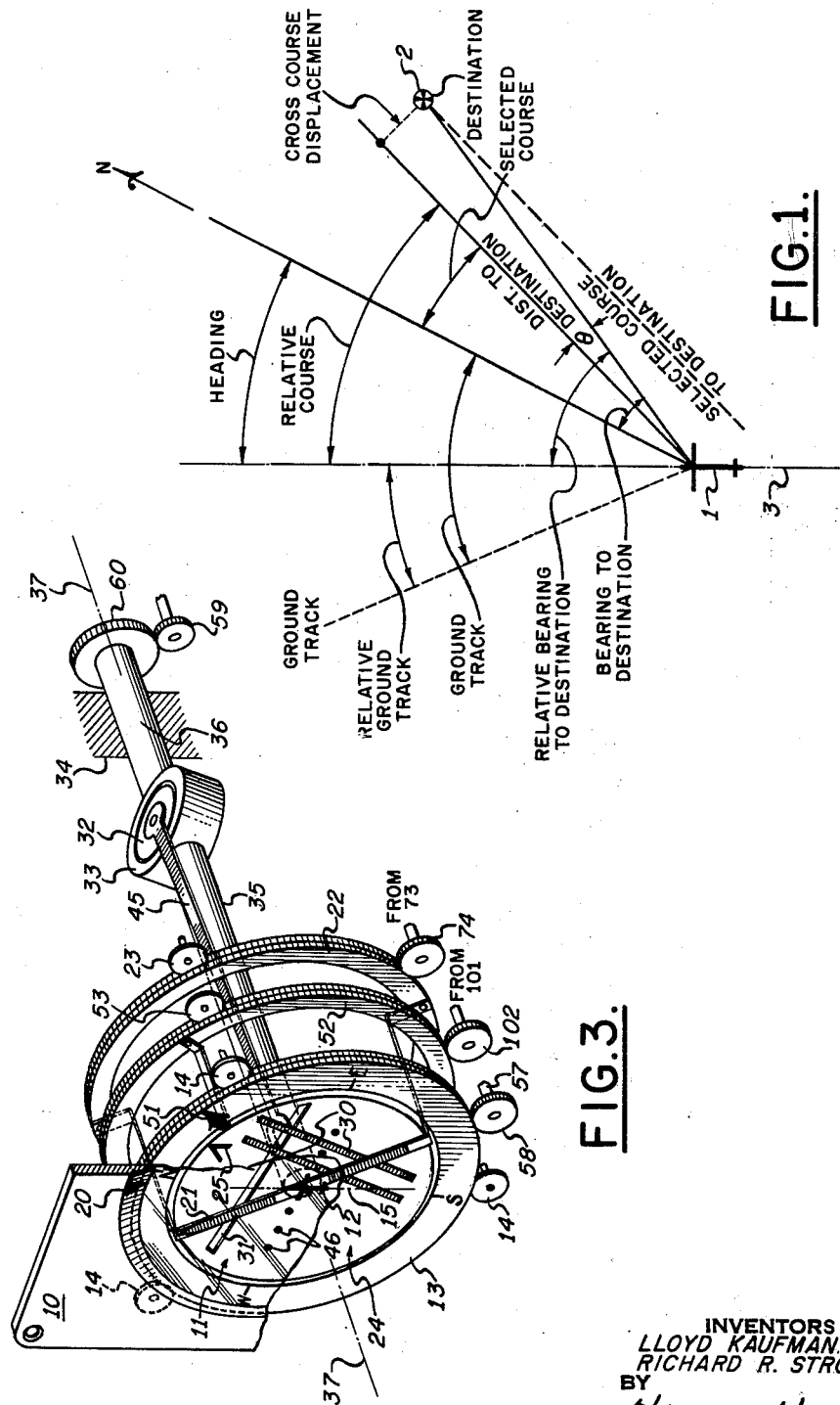
FIG. 1 is an azimuthal representation of an aircraft with respect to a destination.

Referring to FIG. 1 a typical azimuthal condition of an aircraft is shown with respect to a destination. The airplane is flying at a heading of approximately 340° with respect to magnetic north. Due to a strong wind from the northeasterly direction, the airplane 1 is proceeding along a ground track that has a bearing of approximately 310°. Assuming the pilot wishes to fly to a destination 2, he may select a course of 15°. To reach the destination 2 along the selected course, the ground track must coincide with the selected course taking into consideration the cross-course wind. The relative course is the angle between the longitudinal axis 3 of the airplane 1 and the selected course. The relative ground track is the angle between the longitudinal axis 3 and the ground track which is equal to the "crab angle." The bearing to the destination is the angle between a line from the airplane to the destination and north. The relative bearing of the airplane to the destination is the angle between the axis 3 and the destination. As the airplane proceeds along the selected course to the destination, the lateral displacement from the selected course in a direction perpendicular to the selected course is the cross-course displacement.

Figure 2:
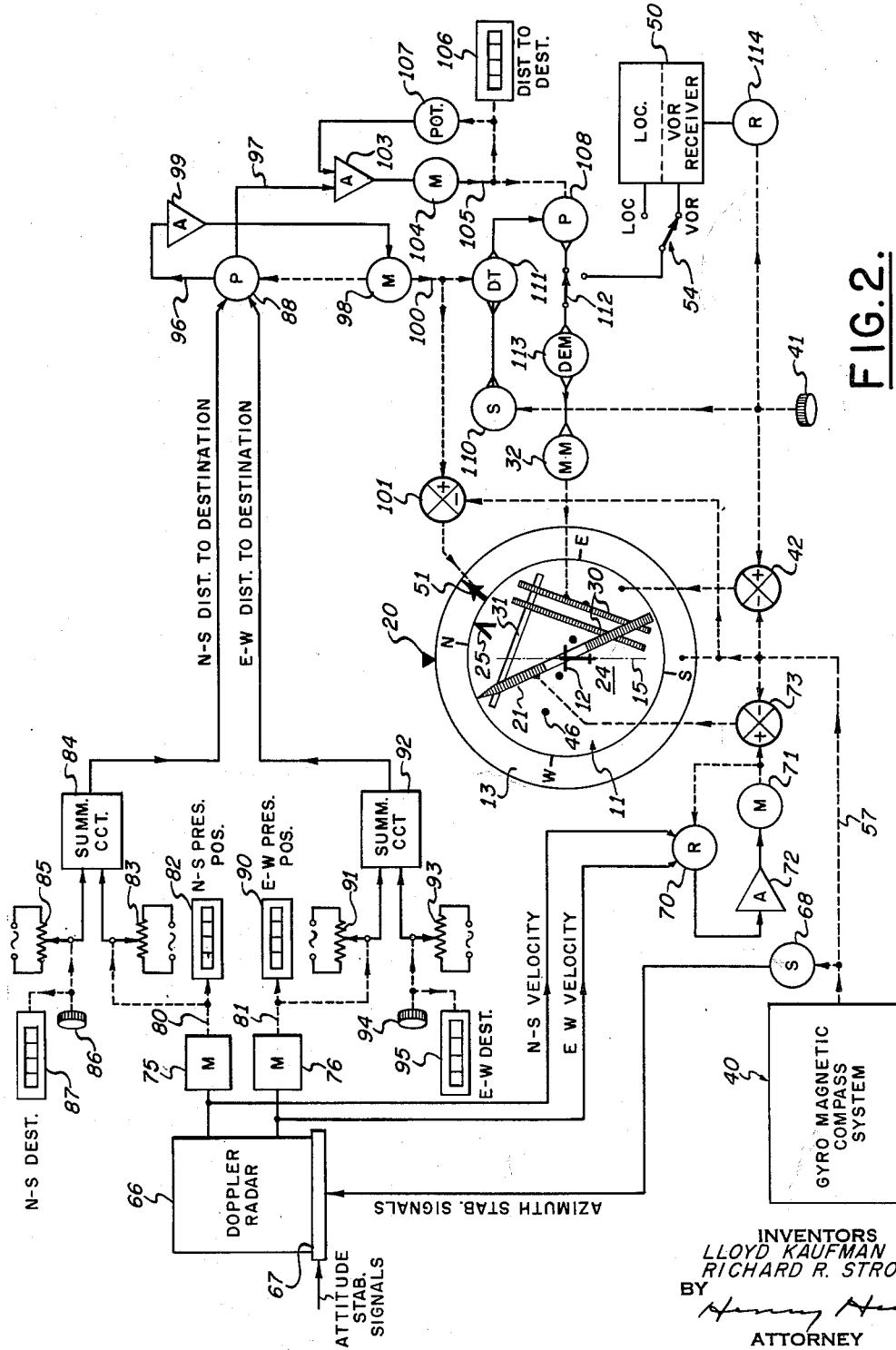
FIG. 2 is a schematic illustration of a preferred embodiment of the navigation instrument of the present invention and the apparatus associated therewith for controlling the indicating elements thereof.

The indicating elements of the navigation instrument of FIGS. 2 and 3 provide a pictorial representation of the flight condition in azimuth as shown in FIG. 1. The navigation instrument of FIGS. 2 and 3 has a housing 10 that forms the supporting and covering structure for the various indicating and certain of the actuating elements. The housing 10 has a transparent opening or window 11 through which the various indicating elements may be viewed.

At the center of the opening 11 is an aircraft reference index 12 which may be engraved or painted on the inner surface of the window or otherwise fixed with respect to the center of the opening 11. The aircraft index 12 is fixed relative to the instrument housing 10 and thus with respect to the airplane 1 within which the navigation instrument is mounted. The aircraft index 12 simulates the airplane 1 of FIG. 1. The aircraft index 12 is so positioned on the window 11 that the fuselage of the representative aircraft is vertical with the intersection of the wings and the fuselage at the center of the opening 11.

Viewable through the opening 11 and cooperable with the aircraft reference index 12 is an annular compass card 13 that is rotatably mounted within the housing 10 around the center of the opening 11 as an axis by means of rotatably mounted support rollers 14. Around the periphery of the compass card 13 are gear teeth that have a peripheral groove into which the rollers 14 fit. The compass card 13 is established relative to the magnetic north by means of a gyromagnetic compass system to be more fully described hereinafter. The compass card 13 is provided with the usual compass calibrations so that the heading of the craft may be determined by the calibration appearing beneath a reference index or lubber line 20 that is fixed relative to the instrument housing 10. The longitudinal axis 15 of the aircraft reference index 12 is aligned with the lubber line 20 in order that the heading of the craft may be read with respect to the longitudianl axis 15 and the lubber line 20.

Also viewable through the opening 11 and cooperable with reference index 12 and compass card 13 is a ground track pointer 21 which simulates the direction of the ground track of the airplane 1. Preferably as shown, the ground track pointer 21 has a tapered tip that cooperates with the compass card 13 to provide the bearing of the ground track. The position of the aircraft index 12 with respect to ground track pointer 21 provides a clear instantaneous indication of the crab angle of the airplane 1 relative to the bearing of the ground track.

The ground track pointer 21 is adapted to be rotated about the center of the opening 11 as an axis to an angle with respect to the longitudinal axis 15 of the aircraft index 12 equal to the difference between the ground track and the heading of the craft, i.e., relative ground track. In the absence of wind causing drift, the ground track pointer 21 will be aligned with the longitudinal axis 15 and the lubber line 20. The ground track pointer 21 is mounted on an annular member 22 which in turn is rotatably supported behind the compass card 13 in the housing 10 about the center of opening 11 as an axis in a manner similar to the compass card 13 by means of rotatably mounted support rollers 23, the rollers 23 engaging a peripheral groove in the gear teeth of member 22. The ground track pointer 21 extends through an annular opening defined by the compass card 13 and a background member or mask 24 so that the pointer 21 is visible on the face of the instrument.

The mask 24 has mounted thereon a selected course index 25 in the form of an inverted V pointer. The apex of the V is cooperative with the compass card 13 to provide an indication of the selected course relative to the heading of the aircraft, i.e. relative course. The mask 24 is rotatably mounted within the housing 10 about the center of the opening 11 as an axis by means to be described. The mask 24 is rotated through an angle equal to the difference between the selected course and the heading of the airplane 1, i.e. relative course which is the course to be flown by the airplane 1 to reach the destination 2.

The selected course index 25 is cooperable with the ground track pointer 21 in order that when the ground track flown by the airplane 1 coincides with the desired course the tapered tip of the pointer 21 fits with in the inverted V of the index 25. The base of the inverted V of the index 25 is cooperable with one end of the parallel bars which form the course deviation pointer 30 in order that when the course deviation is zero, the parallel bars of the pointer 30 are aligned with the base of the inverted V of the index 25. The pointer 30 is also cooperable with the ground track pointer 21 and the aircraft index 12 in order that when the ground track concides with the selected course and there is no course deviation, the parallel bars of the pointer 30 straddle the pointer 21 and other of the pointers 21 and 30 are aligned with the longitudinal axis 15 of aircraft index 12 if there is no cross wind.

The course deviation pointer 30 is preferably disposed intermediate the ground track pointer 21 and the mask 24. The pointer 30 is actuated transversely across the face of the openig 11 and radially with respect to the aircraft index 12 as a function of the magnitude and sense of the displacement of the airplane 1 from the selected course in a manner to be described. The pointer 30 is rotatable around the center of the opening 11 as an axis synchronously with the mask 24. Pointer 30 extends through a slot 31 in the mask 24 to a meter mechanism 32 stabilized with respect to the relative course by means to be explained.

The course deviation pointer 30 is schematically shown supported in the housing 10 by means of a gimbal-like arrangement which comprises a gimbal frame 33 pivotally supported in bearings 34 by shafts 35 and 36 extending coincident with an axis 37 that is preferably aligned with the center of the opening 11. The mask 24 is secured to an end of the shaft 35. The mask 24 acts as a background member for the various indices and preferably is in the form of a truncated sphere having a radius slightly less than the radius of pivotal movement of the pointer 30.

The gimbal frame 33 and hence the mask 24 and the pointer 30 is stabilized in space around the axis 37 in a manner to maintain the course deviation pointer 30 parallel to the magnetic bearing of the selected course regardless of changes in the heading of the airplane 1. This is accomplished by means of a slaved gyromagnetic compass system 40, a course set knob 41 and a differential 42. Once the selected course has been set there is no relative rotation between the compass card 13, the selected course index 25, the mask 24, the pointer 30 and the gimbal frame 33.

The course deviation pointer 30 is displaced laterally of the aircraft index 12 by the meter mechanism 32, the rotor of which is pivotally supported in the gimbal frame 33 for limited rotation about an axis at right angles to the axis of rotation of the gimbal frame 33. The pointer 30 is operatively connected with the meter mechanism 32 by means of an arm 45 which extends from the rotor of the meter mechanism 32 through the slot 31 in the mask 24. The magnitude of the displacement of the airplane 1 from the desired course is indicated to the pilot by calibration in the form of a series of dots 46 extending parallel to the slot 31.

The meter mechanism 32 is excited with signals having a magnitude and sense representative of the amount and direction of the cross-course displacement of the airplane 1 from a desired course or right-left radio displacement signals from a radio receiving apparatus 50, shown in FIG. 2, which is mounted in the airplane 1. The receiver 50, for example, may be a localizer-omnirange radio receiver which operates on an I.L.S. localizer beam as well as on conventional two-course and omnirange facilities depending upon the position of switch 54 in a manner to be explained. The radio receiver 50 may be of the type disclosed in U.S. Patent No. 2,732,550 issued January 24, 1956, to E. F. Reedy entitled Display Instrument for Radio Navigation Systems.

Also viewable through the opening 11 and cooperable with the compass card 13 is a bearing-to-destination pointer 51 in the form of an arrowhead which simulates by its shape the bearing of the destination with respect to the heading of the airplane 1. The pointer 51 is adapted to be rotated about the center of the opening 11 as an axis to an angle with respect to the longitudinal axis 15 of the aircraft index 12 equal to the difference between the bearing with respect to magnetic north to the destination and the heading of the airplane 1, i.e., relative bearing to destination. When the airplane 1 is proceeding along the selected course, in the absence of wind causing drift, the pointer 51 will be aligned with the longitudinal axis 15 and beneath the lubber line 20.

The pointer 51 is mounted on an annular member 52 which is similar to the annular member 22 and is also rotatable about the center of opening 11 as an axis. The member 52 is rotatably supported intermediate the compass card 13 and the member 22 by means of rotatably mounted support rollers 53, the rollers 53 engaging a peripheral groove in the gear teeth of the member 52. The pointer 51 extends through the annular opening defined by the compass card 13 and the mask 24 so that the pointer 51 is visible on the face of the instrument.

The apparatus which actuates the various indices will now be described with reference primarily to FIG. 2. The gyromagnetic compass system 40 provides a signal at its output or heading shaft 57 in the form of a shaft rotation corresponding to the heading of the airplane 1 relative to magnetic north. A suitable gyromagnetic compass system is disclosed in U.S. Patent No. 2,357,319 issued September 5, 1944, to Esval et al. The heading shaft 57 is connected to drive the compass card 13 by means of a drive gear 58 which meshes with the gear teeth on the periphery of the compass card 13.

The heading shaft 57 is also connected to one input of the differential 42 which has its other input connected to the course set knob 41. The output of the differential 42 is the algebraic summation of the selected course as determined by the setting of knob 41 and the heading of the airplane 1 as established by the position of shaft 57. The output of the differential 42 is connected by a drive gear 59 and a driven gear 60, the latter being mounted on the shaft 36, to rotate the mask 24 and the course deviation pointer 30 synchronously in the manner previously described.

To provide signals representative of the velocity of the airplane 1 in the north-south and east-west directions, a Doppler radar device 66 is mounted on a stabilized platform 67 in the airplane 1. The platform 67 is stabilized in attitude and azimuth in a conventional manner not shown. The azimuth stabilization signal may be provided from a synchro heading transmitter 68 connected to be responsive to the position of the heading shaft 57 while a vertical gyroscope (not shown) may be utilized to provide pitch and roll stabilization signals.

In an airborne Doppler radar system, electromagnetic energy is transmitted to the surface of the earth in a narrow beam which makes an angle with the direction of airplane motion. The frequency of the energy which is reflected back to the airplane has been Doppler shifted because of the relative motion between the airplane and the ground. For purposes of example, the present invention will be described utilizing a conventional airborne Doppler radar that provides signals representative of the components of the airplane's velocity in the north-south and east-west directions. The outputs from the Doppler radar have a magnitude representative of the velocity of the airplane along the particular axis.

The outputs of the Dobbler radar device 66 are connected to a ground track resolver 70 in order that a signal representative of the velocity of the airplane 1 in the north-south direction is connected to one stator winding of the resolver 70 while a signal representative of its velocity in the east-west direction is connected to the stator winding disposed 90° with respect to the first winding. The output of the resolver 70, for example, corresponding to the east-west direction is applied to a ground track servomotor 71 through an amplifier 72. The output shaft of the servomotor 71 is connected to the rotor winding of the resolver in order that the east-west velocity component is driven to zero. The position of the output shaft of the servomotor 71 is thus representative of the direction of the ground track with respect to the magnetic north.

The output shaft of the servomotor 71 is connected to one input of a differential 73 which has its other input connected to the heading shaft 57. The output of the differential 73 is the algebraic summation of the two inputs which is the angle between the longitudinal axis 3 of the airplane 1 and the ground track, i.e., relative ground track. The output of the differential 73 is connected by a drive gear 74 to rotate the annular member 22 which in turn rotates the ground track pointer 21 an angle equal to the relative ground track.

The outputs from the Doppler radar device 66 representative of the north-south velocity and the east-west velocity are also connected to integrating motor means 75 and 76 respectively. Means 75 and 76 integrate the north-south and east-west velocities respectively to provide shaft rotations representative of the distance travelled in the north-south and east-west directions respectively on output shafts 80 and 81.

The output shaft 80 is connected to a counter 82 to provide an indication of the distance travelled or present position in the north-south direction. The shaft 80 is also connected to position the wiper arm of a potentiometer 83 in accordance with the shaft rotation to provide an electrical signal representative of the distance travelled by the airplane in the north-south direction to an input terminal of a summing circuit 84. The distance to the destination in the north-south direction is set in on a potentiometer 85 by positioning the wiper arm thereof in accordance with the rotation of knob 86. The distance to the destination in the north-south direction is indicated on a counter 87 connected to the knob 86. The signal representative of the distance to the destination in the north-south direction is connected to the other input terminal of the summing circuit 84. The output of the summing circuit 84 is the difference between its two input signals, i.e., representative of the remaining distance to the destination in the north-south direction which is connected to one of the stator windings of a bearing to destination resolver 88.

Similarly, the output shaft 81 is connected to a counter 90 to provide an indication of the distances travelled in the east-west direction. Shaft 81 is also connected to position the wiper arm of a potentiometer 91 to provide an electrical signal respective of the distance travelled in the east-west direction by the airplane to an input terminal of a summing circuit 92. The distance to the destination in the east-west direction is set in on a potentiometer 93 by positioning the wiper arm thereof in accordance with the rotation of a knob 94. The distance to the destination in the east-west direction is also indicated on a counter 95 which is connected to the knob 94. The signal representative of the distance to destination in the east-west direction is connected to the other input terminal of the summing circuit 92. The output of the summing circuit 92 is the difference between its two input signals, i.e., the remaining distance to the destination in the east-west direction which is connected to a stator winding that is perpendicular to the other stator winding of the resolver 88.

In the resolver 88, the coordinates are shifted to provide outputs representative of the cross-course distance to the destination on a lead 96 and the on-course distance to the destination on a lead 97. The lead 96 is connected to a servomotor 98 through an amplifier 99. The output shaft 100 of the servomotor 98 is connected to the rotor of the resolver 88. By this arrangement the cross-course distance to the destination signal energizes the servomotor 98 to rotate its ouput shaft 100 in a direction to reduce the cross-course signal to zero. The position of the output shaft 100 of servomotor 98 is thus representative of the bearing to the destination.

The shaft 100 is connected to one input of a differential 101 which has its other input connected to the heading shaft 57. The output of the differential 101 is the difference between the bearing to destination and the heading of the airplane, i.e., the relative bearing to the destination. The output shaft of the differential 101 is connected through drive gear 102 to rotate the annular member 52 in accordance with the relative bearing to the destination which in turn rotates pointer 21 accordingly.

The signal representative of the on-course distance to the destination is connected by the lead 97 through an amplifier 103 to energize a servomotor 104 to provide a rotation of its output shaft 105 representative thereof. The output shaft 105 is connected to a counter 106 which provides a visual indication of the distance to the destination. The shaft 105 is also connected to a feedback potentiometer 107 which provides a position feedback signal to an input terminal of the amplifier 103. The shaft 105 is also connected to position the wiper arm of a cross-course displacement potentiometer 108 for reasons to be explained.

A synchro course transmitter 110 has its rotor connected to be rotated in accordance with the rotation of the course set knob 41 and provides a signal representative of the selected course to a stator winding of a cross-course differential transformer 111. The rotor of the differential transformer 111 is connected to be rotated by the shaft 100 in accordance with the bearing to the destination. The output of the differential transformer 111 is an electrical signal proportional to the sine of the difference between the bearing to the destination and the selected course which is sin $\theta$, the angle $\theta$ being shown in FIG. 1. The output of the differential transformer 111 is applied across the resistive winding of the potentiometer 108. The output of the potentiometer 108 is then the product of the signals representative of sin $\theta$ and the on-course distance to the destination which is equal to the cross-course displacement. With the contact arm of a switch 112 in the position shown, the output of the potentiometer 108 is applied to a demodulator 113 where it is demodulated before energizing the meter mechanism 32 to drive the pointer 30 in a manner described previously.

When the pilot is flying the airplane 1 with respect to a radio beam as defined, for example, by a VHF omnirange (VOR) radio navigation system having a bearing corresponding to the selected course, the contact arms of the switches 54 and 112 are in downward conditions connecting the VOR portion of the receiver 50 to the demodulator 113. A VOR transmitter station transmits a radio pattern comprising a variable phase signal varying in accordance with azimuth angles referenced to magnetic north and a fixed reference phase signal, while the mobile station or airplane includes a receiver such as 50, for comparing the phase of the modulation produced by the variable phase signal and that of the reference phase signal to thereby determine the azimuth of the mobile station. The receiver 50 is illustrated in block form since the components thereof are conventional and well known. A VOR radio navigation system enables a pilot to select any radial radio course toward or away from the VOR transmitter station by rotation of the course set knob 41 after tuning the receiver 50 to the desired station. Rotation of the knob 41 sets in the bearing of the desired VOR radial and simultaneously by means of the synchro resolver 114 establishes the correct phasing of the receiver 50 in order that the receiver 50 provides left-right signals in accordance with left-right deviations of the airplane 1 with respect to the selected radial. The cross-course deviation pointer 30 is then displaced an amount and in a direction corresponding to the magnitude and sense of the deviation of the airplane 1 from the selected radio beam.

During an approach when the LOC mode is selected, switch 54 is in its upper position and the runway heading is set in by means of a course set knob 41 to obtain a correct picture of the airplane's deviation from the localizer beam. Although the invention has been described with respect to a VOR-LOC receiver it will be appreciated that any other type of receiver may be employed which provides deviation signals from a selected radio course.

Figure 4:
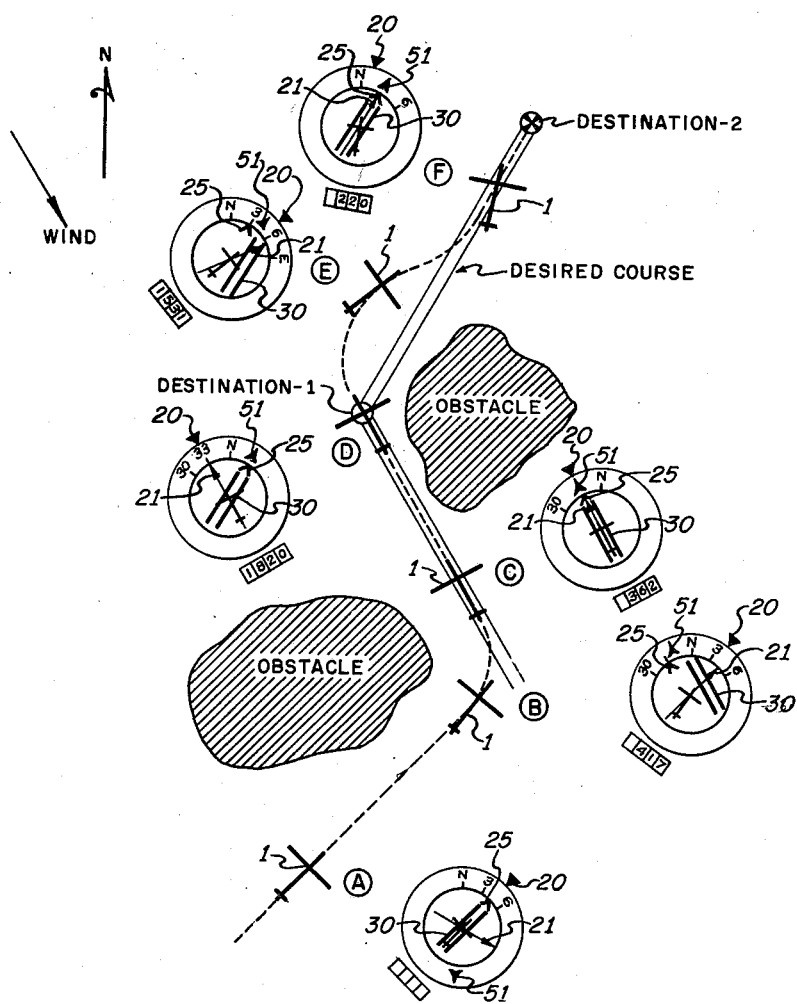
FIG. 4 is a flight path diagram illustrating the operation of the instrument of the present invention.

For the purpose of illustrating a picture of the horizontal situation during operation of the present invention, the instrument is shown in FIG. 4, under typical flight conditions with the switch 112 in the condition shown. In A, the pilot desires to fly a heading of 45° and the radar is assumed to be off. An annunciator (not shown) may be provided for indicating when the Doppler radar 66 is operative or inoperative. Under these conditions the bearing-to-destination, ground track, cross-course displacement and distance-to-destination indications are inoperative. To fly a heading of 45°, the pilot sets the selected course index 25 to 45° by rotating the knob 41 and then steers the airplane to maintain the index 25 aligned with the lubber line 20. The index 25 is, therefore vertical. The present position and distance to destination counters are not shown for purposes of simplicity.

In B, the airplane 1 is approaching the desired ground track to the destination No. 1. In order to avoid obstacles, a course of 330° is necessary. Before reaching the desired ground track, the pilot turns on the Doppler radar 66, sets in his present position on the knobs 86 and 94 and selects his course to the destination No. 1 by rotating the knob 41. All the indicators on the instrument are now operative. The selected course index 25 shows that the pilot has selected a desired course 330° while the bearing-to-destination pointer 51 shows the present bearing to the destination is about 335°. The aircraft heading as indicated by the lubber line 20 is about 40° while the ground track is about 45° according to the position of the ground track pointer 21. The course deviation pointer 30 shows that the airplane 1 is to the left of the desired ground track. The angle between the course deviation pointer 30 and the ground track pointer 21 indicates the intercept angle with the desired ground track. The distance to the destination No. 1 is 41.7 miles.

In C, the airplane 1 is on the desired ground track as evidenced by the ground track, bearing-to-destination and course deviation indicators being aligned, and no cross-course displacement indicated. The wind is parallel to the selected course as indicated by the arrow and does not cause drift as shown by the ground track pointer 21 being aligned with the longitudial axis 15 of the aircraft index 12. The distance to the destination No. 1 is now 36.2 miles.

In D, the destination No. 1 has been reached, the pilot has changed to destination No. 2 and has rotated the selected course index 25 to align it with the new bearing to destination as shown by the pointer 51. The display on the instrument shows that the airplane 1 is on course since the parallel bars of the pointer 30 are aligned with the base of the inverted V of index 25, but it is moving away from the desired course as shown by the position of the ground track pointer 21. The distance to the destination No. 2 is 182 miles.

E is similar to B. The airplane 1 is to the left of the desired track but is headed to intercept it at an angle of about 30°. The distance to the destination No. 2 is 153.1 miles.

F is similar to C except a large crab angle or drift angle is required due to the cross-course component of the prevailing wind tending to blow the airplane 1 off course. This is shown by the number of degrees that the longitudinal axis 15 of the aircraft index 12 is displaced from the ground track pointer 21. The distance to the destination No. 2 is now 22 miles.

From the above explanation it will be apparent that the ground track can be readily determined and a desired intercept angle selected at which to intercept the desired course. If the course deviation is great, the airplane can be flown perpendicular to the desired course until the course deviation pointer 30 starts to move off its stops. The intercept angle can then be made progressively more shallow, the exact angle being determined readily by inspection, until the ground track coincides with the desired course. In this condition, the point of the ground track pointer 21 fits within the inverted V of the selected course index 25 and the course deviation pointer 30 straddles the ground track pointer 21. With this arrangement, slight misalignment of the ground track pointer 21 can be readily detected and corrected immediately. Since misalignment of the ground track pointer 21 eventually leads to course error, the early detection of ground track errors provides an anticipatory signal which permits the holding of a selected course with considerably greater accuracy than previously.

Further, without a ground track indication, the heading has to be adjusted by trial and error until the course deviation ceases to move. The determination of the proper crab angle by trial and error as previously required is time consuming and awkward.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A navigation instrument for dirigible craft comprising a reference index adapted to indicate the heading of said craft, means including a positionable ground track ponter cooperable with said index for indicating the orientation of the ground track with respect to said craft heading, and meanse including a positionable course deviation pointer cooperable with said index for indicating the deviation of said craft from a desired course.

2. A navigation instrument for dirigible craft for providing a horizontal situation display comprising means including a heading scale movable in accordance with the heading of said craft, a reference index cooperable with said scale for indicating the heading of said craft, means including a positionable ground track pointer cooperable with said index for indicating the orientation of the ground track with respect to said craft heading, and means including a positionable course deviation pointer cooperable with said index for indicating the deviation of said craft from a desired course.

3. An instrument as described in claim 2 including means including a selected course index cooperable with said heading scale for indicating the selected heading, said selected course index also being cooperable with said reference index, ground track pointer and course deviation pointer.

4. An instrument as described in claim 3 including means including a bearing-to-destination pointer cooperable with said heading scale for indicating the bearing of said craft to said destination, said bearing-to-destination pointer also being cooperable with said reference index and selected course index, said bearing-to-destination pointer, ground track pointer, course deviation pointer, and selected course index being aligned when said craft is proceeding on course.

5. A navigation instrument for dirigible craft for providing an azimuthal pictorial presentation comprising a dirigible craft reference index adapted to indicate the heading of said craft, a ground track pointer cooperable with said index and positionable with respect thereto for indicating the orientation of the ground track with respect to said craft heading, means responsive to the position of said ground track with respect to said craft for actuating said ground track pointer in accordance therewith, a course deviation pointer cooperable with said index and said ground track pointer and positionable with respect thereto for indicating the deviation of said craft from a desired course, and means responsive to the deviation of said craft with respect to said course for actuating said course deviation pointer.

6. A navigation instrument for dirigible craft for providing a horizontal situation display comprising a heading scale movable in accordance with the heading of said aircraft, means including a directional reference for moving said heading scale in accordance with the heading of said craft, a dirigible craft reference index cooperable with said heading scale for indicating the heading of said craft, a ground track pointer cooperable with said index and positionable with respect thereto for indicating the orientation of the ground track with respect to said craft heading, means responsive to the position of said ground track with respect to said craft for actuating said ground track pointer in accordance therewith, a course deviation pointer cooperable with said index and said ground track pointer and positionable with respect thereto for indicating the deviation of said craft from a desired course, and means responsive to the deviation of said craft with respect to said course for actuating said course deviation pointer.

7. An instrument as described in claim 6 including means including a selected course index cooperable with said heading scale for indicating the selected heading, said selected course index also being cooperable with said reference index, ground track pointer and course deviation pointer and responsive to the selected course to the destination for actuating said selected course index.

8. A navigation display instrument for enabling a pilot to maneuver an airplane to approach and thereafter maintain a desired course comprising an aircraft reference index adapted to indicate the heading of said airplane, a ground track pointer positionable with respect to said index for indicating the bearing of the ground track with respect to said airplane heading, means responsive to the position of said airplane with respect to said ground track for actuating said ground track pointer in accordance therewith, a course deviation pointer positionable with respect to said index and said ground track pointer for indicating the deviation of said airplane from a desired course, and means responsive to the deviation of said airplane with respect to said desired course for actuating said course deviation pointer, said positionable pointers being arranged for mutual alignment with each other when the airplane is being flown along said desired course.

9. A steering aid system for manually piloted dirigible craft comprising a directional reference, a rotatable annular compass card responsive to said directional reference, a fixed dirigible craft reference index cooperable with said compass card for indicating the heading of said craft, a ground track pointer cooperable with said compass card and said index and positionable with respect thereto for indicating the bearing of the ground track with respect to said craft heading, means responsive to the algebraic summation of the heading of the ground track and of said craft with respect to the north for actuating said ground track pointer in accordance therewith, a course deviation pointer cooperable with said index and said ground track pointer and positionable with respect thereto for indicating the deviation of said craft from a desired course, and means responsive to the deviation of said craft from said desired course for actuating said course deviation pointer.

10. An instrument as described in claim 9 including means including a selected course index cooperable with said compass card for indicating the desired course and with said course deviation pointer for indicating when said craft is on course.

11. An instrument as described in claim 10 including means including a bearing-to-destination pointer cooperable with said compass card for indicating the bearing to the destination, said bearing-to-destination pointer, ground track pointer, course deviation pointer, and selected course index being aligned when said craft is proceeding on course.

12. A flight instrument for aiding steering of an airplan in azimuth along a desired radio-defined course comprising an aircraft reference index adapted to indicate the heading of said airplane, a ground track pointer positionable with respect to said index for indicating the bearing of the ground track with respect to said airplane heading, means responsive to the position of said airplane with respect to said ground track for actuating said ground track pointer in accordance therewith, a course deviation pointer positionable with respect to said index and said ground track pointer for indicating the deviation of said airplane from a desired radio-defined course, and means responsive to the deviation of said airplane with respect to said radio-defined course for actuating said deviation pointer in accordance with the magnitude and sense of said deviation, said positionable pointers being arranged for mutual alignment with each other when the airplane is being flown along the desired radio-defined course.

13. An azimuthal flight indicating instrument for an airplane comprising a directional reference for providing a signal representative of the heading of said airplane, means including a compass card rotatable in accordance with said heading signal, a fixed reference index simulating said airplane cooperable with said compass card for indicating the heading of said airplane, means including Doppler radar means for providing a signal representative of the heading of the ground track of said airplane, ground track pointer means positionable with respect to said index for indicating the bearing of said ground track with respect to said airplane heading, means responsive to said airplane and ground track heading signals for actuating said ground track pointer in accordance with the algebraic summation thereof, means for providing a signal representative of the deviation of said airplane from a desired course, and course deviation pointer means responsive to said deviation signal and positionable with respect to said index and said ground track pointer means for indicating the deviation of said airplane from said desired course and said ground track.

14. An instrument of the character described in claim 13 wherein said course deviation pointer means includes coordinate shifting means responsive to the signals from said Doppler radar means for providing a signal representative of the cross-course displacement of said airplane from said desired course.

15. An instrument of the character described in claim 13 wherein said course deviation pointer means includes a radio receiver for providing a signal representative of the lateral displacement of said airplane from a desired radio-defined course.

References Cited in the file of this patent
UNITED STATES PATENTS

| | | |
|---|---|---|
| 2,742,637 | Braddon | Apr. 17, 1956 |
| 2,998,600 | Majendie | Aug. 29, 1961 |